Patented Feb. 23, 1943

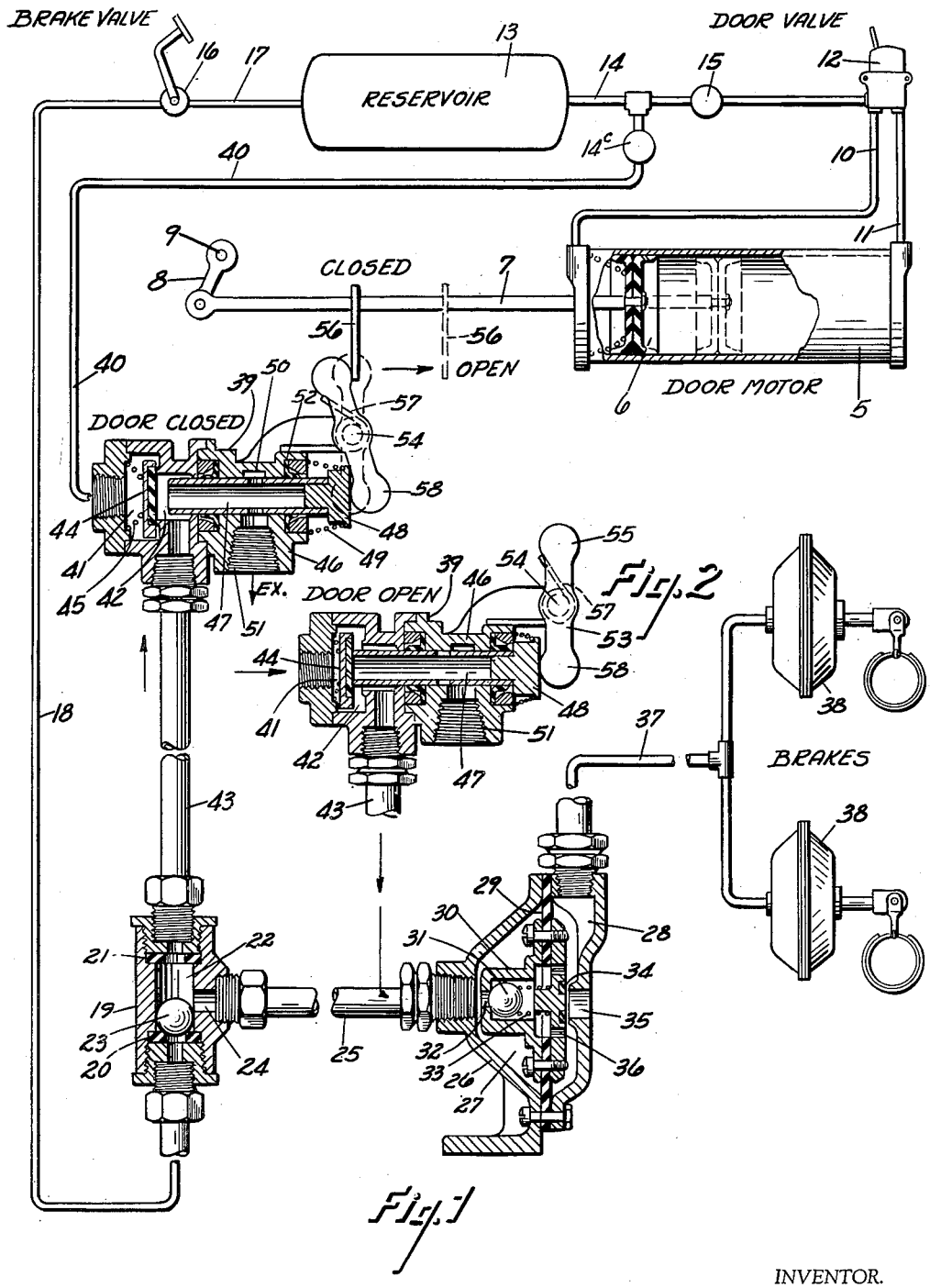

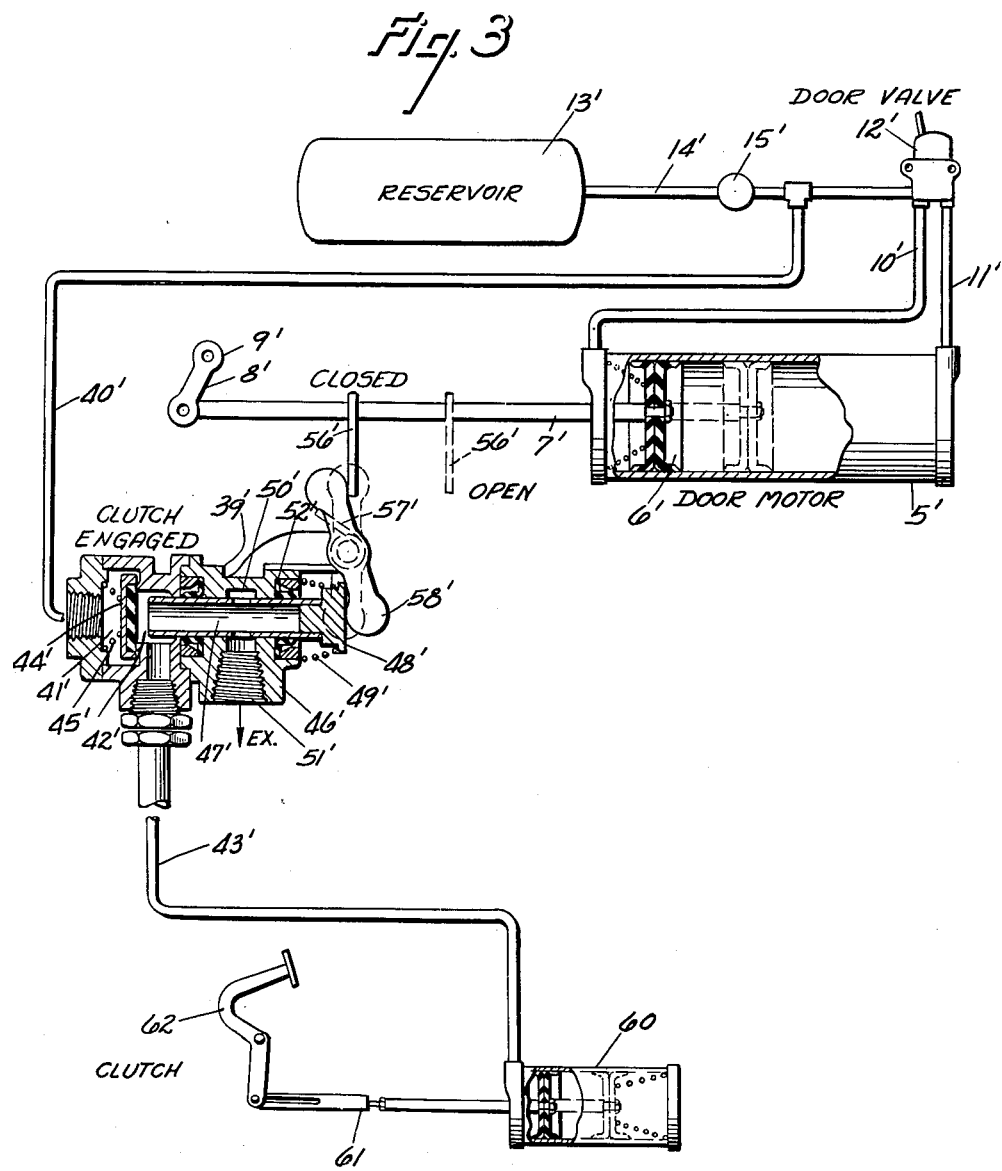

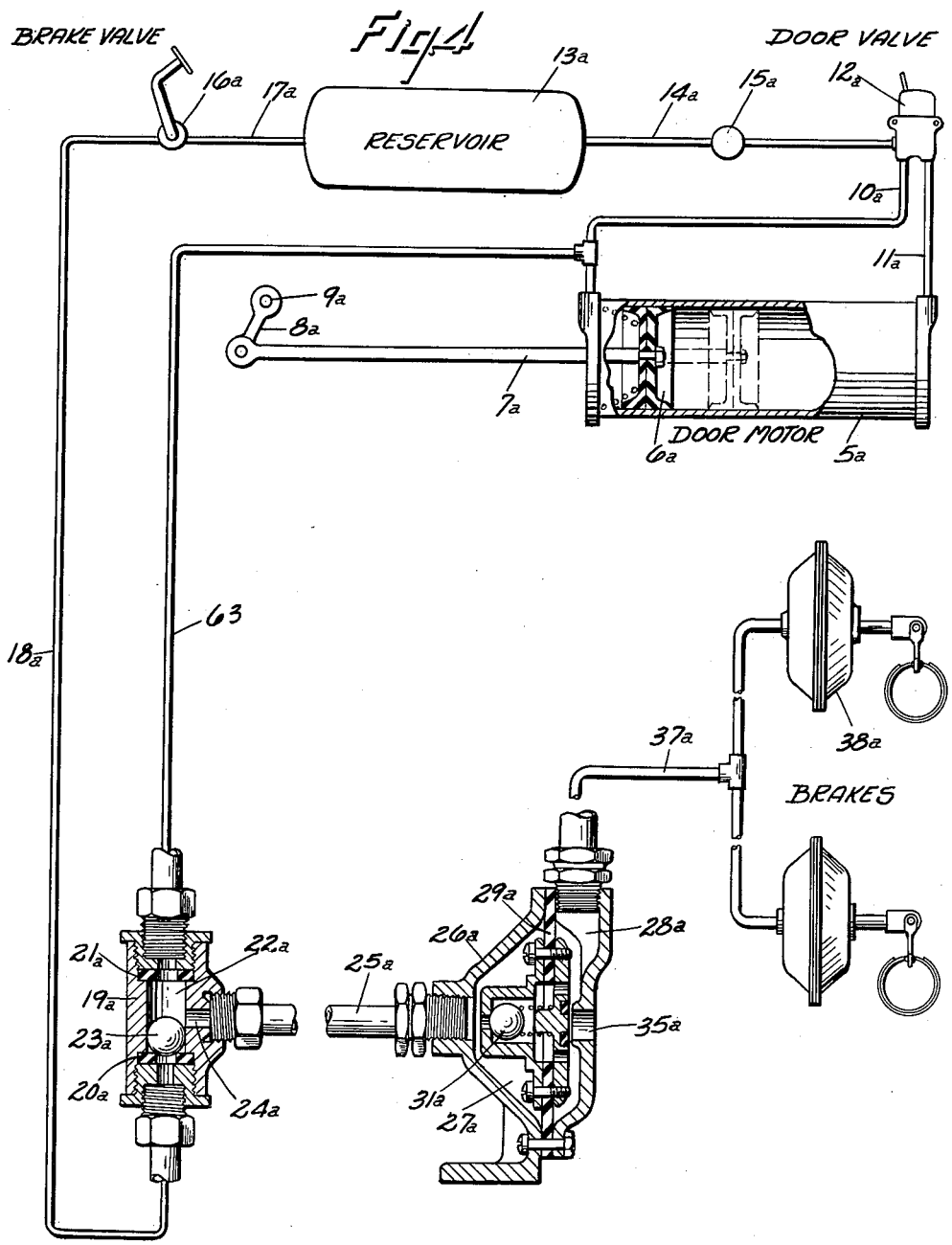

2,311,806

UNITED STATES PATENT OFFICE 2,311,806

DOOR AND BRAKE INTERLOCK

John R. Almond, Cleveland, Ohio, assignor to The Midland Steel Products Company, Cleveland, Ohio, a corporation of Ohio Application December 21, 1939, Serial No. 310,416

5 Claims. (Cl. 303—6.1)

This invention relates to new and useful improvements in the safety and economical operation of buses wherein operation of the brakes has no control over the doors, but the door operation does control operation of the brakes.

An important object of the invention is to provide a system wherein the brakes of a bus will be automatically applied upon initial opening movement of the door and cannot be released until the door is within an inch of fully closed position. Release of the brakes is taken away from the motorman's control, unless the doors are fully closed. A broad aspect of the invention provides for the removal of a bus controlling function or adjunct, from the motorman's control so long as the bus door remains open to a slight degree. Thus, the door must be practically closed before the bus can be set into motion.

This system also prevents movement of the bus when a person becomes caught in the doorway and also prevents passengers from being accidentally thrown through the doorway while the bus is in motion, since the bus is automatically stopped whenever the door begins its opening movement from any cause, or is not fully closed. At the same time, the door operation is quite independent of the brake actuation, in that it may be controlled without first operating the brakes and with less pressure than is employed to set the brakes.

Another object of the invention is to provide a construction and arrangement of parts which may be employed to disengage the clutch of an automotive vehicle whenever the door is opened to any degree. Thus, the operation of setting the vehicle into motion is taken away from the motorman's control until the door is fully released.

Another object of the invention is to provide a system in which operation of the brakes has no effect upon the operation of the door but in which any opening of the door automatically applies the brakes.

A further object of the invention is to provide an improved form of interlock valve which is operated by movement of the door motor or engine as it is called in the trade.

In the accompanying drawings forming a part of the description and wherein like numerals are employed to designate like parts throughout the several views, Fig. 1 is a diagrammatic view of the system showing the essential valves in section.

Fig. 2 is a longitudinal section through the improved interlock valve with its parts disposed in position when the door is open.

Fig. 3 is a diagrammatic view of a modification of the system and in which the clutch of an automotive vehicle is controlled instead of the brakes as in Fig. 1.

Fig. 4 is a diagrammatic view of another modified form of the system in which the interlock valve is dispensed with by arranging the piping diagram.

Referring now more particularly to the drawings and to Figs. 1 and 2, the numeral 5 designates a door motor or engine cylinder with a double acting piston 6 therein having a piston rod 7 pivotally connected to a crank 8 secured to a door post 9 for operating a pair of doors as fully disclosed in the Almond et al. pending application, Serial No. 160,134, filed August 21, 1937, wherein a full disclosure of the linkage for operating a pair of doors may be found. A door opening pipe 10 and a door closing pipe 11 lead from opposite ends of the door motor 5 to a snap action valve 12 such as disclosed in the Almond copending application Serial No. 255,713 filed February 10, 1938, now Patent No. 2,243,937 issued June 3, 1941, whereby air under pressure may be supplied to either end of the door motor at the will of the motorman for opening or closing the doors. Air under pressure to this valve 12 is furnished from a reservoir 13 through a pipe 14 having a pressure regulating valve 15 whereby the desired amount of pressure is taken from the reservoir for operating the doors without injurious effects upon a passenger who may become accidentally caught between the doors. It has been found that a working pressure of 30 pounds per square inch is safe and effective for operating the doors.

Reservoir pressure is also piped to a brake control valve 16 operated by the customary foot pedal, by a pipe 17. This brake control valve 16 may be of the usual type which in its normal position cuts off pressure from the reservoir while exhausting the pipe 18 leading to the brakes; has a brake applying position in which the pipe 18 is connected with the reservoir pressure while its exhaust port is cut off, and in a third position, laps the brakes in brake applied position.

The pipe 18 leads from the foot control valve to one end of a double check valve 19 having aligned elastic seats 20 and 21 in a longitudinal bore 22 for seating a ball valve 23 in the direction of the pressure.

The side of the double check valve 19 is provided with a port 24 midway of the bore 22 which is connected with a pipe 25 leading into a quick release valve 26. This valve 26 is divided into a pair of chambers 27 and 28 by a flexible diaphragm 29 clamped between the two sections of the valve casing as shown. The diaphragm is provided with a central opening about which upon opposite sides of the diaphragm is clamped a valve cage 30 containing a seat and a ball valve 31 normally forced upon its valve seat by a coil spring 33. The section of the valve cage located in chamber 28 is provided with an elastic valve face 34 adapted to seat and close an exhaust port 35 in the quick release valve casing when air pressure is directed toward the brake through pipe 25. This portion of the valve cage is also provided with apertures 36 surrounding the valve 34 and communicating the chamber 28 with the interior of the valve cage so that when this valve is seated by air pressure forcing the diaphragm 29 to the right of the figure, air pressure removes ball valve 31 from its seat and passes through apertures 36 into chamber 28 and thence through the pipe 37 into brake chambers 38. When the brake control valve is set to release the brakes, air pressure to the brakes is cut off from the quick release valve and the diaphragm 29 resumes its normal intermediate position allowing air pressure to exhaust from the brake chambers into the chamber 28 and out through the exhaust port 35, inasmuch as this brake pressure reseats the ball valve 31, causing a quick release of air pressure from the brake chambers without requiring the air pressure to vent slowly back through the brake control valve or the interlock valve 39.

In order to interlock the brake and doors to assure application of the brakes whenever the doors are opened, an interlock valve 39 is mechanically associated with the door motor and fluidly connected with the reservoir and brakes. A pipe 40 connected to reservoir pipe 14 between the reducing valve 15 and the reservoir 13 leads into a pressure chamber 41 at one end of the interlock valve 39. A pressure reducing valve 14C is installed in the line 40 so that any desired pressure at reservoir pressure or less can be controlled from a door operation and admitted to the interlock valve. A valve seat is provided between this chamber 41 and an adjacent chamber 42, which latter is connected by a port to a pipe 43 leading to the valve seat 21 of the double check valve 19. A floating valve 44 having an elastic face is biased upon the valve seat with a coil spring 45, to normally separate the chambers 41 and 42.

The interlock valve is provided with a second casing section suitably secured to the first section with a bore slidably receiving a tubular valve 47 having an enlarged closed end 48 normally urged outwardly of the valve casing by a spring 49 to register an exhaust port 50 of the tubular valve with air exhaust port 51 of the interlock valve to thereby normally exhaust pipes 25 and 43 when the door is in closed position. Opposite ends of valve section 46 are provided with elastic L-shaped packing rings 52 to slidably engage the tubular valve 47 in air tight relationship with the interlock valve casing. With the valve 47 in its normal position as shown in Fig. 1, the inner end thereof is disposed in chamber 42 spaced from the valve 44 so that air pressure exhausting from pipes 25 and 43 may pass into the interior of the tubular valve and exhaust through exhaust port 51.

In order to shift the interlock valve to automatically apply the brakes whenever the door of the bus opens, the interlock valve is provided with a lever 53 pivoted between its ends at 54 to an extension of the interlock valve casing, with one end 55 of the lever in the path of movement of a trip 56 secured to the piston rod 7 of the door motor in such a position that when the door motor is in a position for closing the bus door, the trip 56 engages and holds the lever against the tension of a spring 57 coiled about the pivot 54 to normally urge the lower end 58 of the lever into engagement with the enlarged end 48 of the tubular valve to move it inwardly against the pressure of springs 45 and 49. Engagement of the trip 56 with the upper end of lever 53 when the doors are in closed position, holds this lever in the position shown in Fig. 1 so that the spring 45 can close valve 44, and the spring 49 can move the tubular valve 47 away from valve 44 and align the port 50 with the exhaust port 51 whereby the brake pipes can release their pressure through the interlock valve when the doors are in closed position. However, when the door motor is operated to open the doors by manipulation of the valve 12, the trip 56 is moved away from lever 53 thereby permitting the spring 57 to move the lower end 58 of the valve lever inwardly toward the interlock valve and thereby move the tubular valve 47 inwardly to engage the valve 44 and unseat it so that air pressure from pipe 40 is passed into chamber 42 of the interlock valve and then through pipe 43, double check valve 19, pipe 25, quick release valve 26, into the brake chamber 38 to apply the brakes whenever the doors begin their opening movement. Trip 56 is placed upon the piston rod 7 and with relation to the interlock valve so that when the piston of the door motor moves a fraction of an inch from door closed position the interlock valve lever 53 is released to shift the valve to admit air at the desired pressure to the brakes. Whenever the brakes are applied by operating the brake control lever, predominating air pressure through the line 18 moves the check valve 23 upon the seat 21 and passes through pipe 25 to the brake chambers. Thus, it will seem that operation of the brakes does not affect operation of the door, but the operation of the door, as soon as it begins to open to a slight degree, automatically shifts the interlock valve and causes an application of the brakes. Due to this arrangement of parts, it will be obvious that the brakes of the vehicle do not release until the doors are within about one inch of fully closed position, so that in case a passenger becomes caught between the doors during their closing and should the motorman attempt to start the bus, it will not move and will promptly warn him of the condition so that he can immediately operate the door control valve 12 to open the doors and release the passenger in the event he is unable to extricate himself, which is most unlikely since he can very easily overcome the 30 pounds pressure employed in closing the doors. Thus, with the small degree of pressure employed in the door operation, no injury could result to a passenger even though some part of his person becomes engaged between the doors.

In Fig. 3 of the drawings is shown the interlock valve 39 connected with a power cylinder for holding the clutch disengaged whenever the bus doors are not fully closed, thereby preventing the bus from being moved under power when the bus doors are open. Parts shown in Fig. 3 corresponding with the parts shown in Figs. 1 and 2, are designated with identical numerals with a prime coefficient added thereto. Thus it will be evident that the door motor 5' is operated as in the preceding modification and carries a trip 56' to operate the interlock valve 39' to allow passage of air pressure from the reservoir 13' through the interlock valve into pipe 43' and into the forward end of the power cylinder 60 whenever the trip 56' moves to a position disengaging the interlock valve lever 53' representing a door open position. The piston rod 61 of the power cylinder 60 is provided with an elongated slot to receive the lower end of clutch operating pedal 62 so that whenever the doors are closed, the clutch operating pedal 62 may be manually moved in the customary manner to engage and disengage the clutch to permit normal driving of the bus. However, when the doors are opened, the trip 56' disengages the interlock 53' thereby permitting parts of the interlock valve to move to the position shown in Fig. 2 whereby air pressure from the reservoir passes through the valve and into the forward end of the power cylinder 60 to depress the clutch pedal so that the motorman cannot move the bus under power until the doors have been restored to their fully closed position. Whenever the doors close, trip 56' engages the interlock lever 53' to return the valve parts to a position for exhausting the forward end of the power cylinder 60 through the exhaust port 51' of the interlock valve. In this position of parts, the usual clutch spring returns the clutch to engaged position and so long as the doors remain closed, the clutch pedal 62 can be manually depressed to disengage the clutch since its lower end travels idly in the slotted portion of the piston rod 61.

In Fig. 4 another modified system is shown wherein the brakes 38 are applied whenever the door motor moves the doors to an open position. In this figure, parts which correspond to those in Figs. 1 and 2 are designated with corresponding numerals with a letter (a) coefficient added thereto. Thus, it will be readily apparent that no interlock valve 39 is employed in this hookup, so that the only change required over Fig. 1, is to connect one end of a pipe 63 with the double check valve 19a as illustrated and connect the opposite end of pipe 63 with the door opening pipe 10a instead of to the reservoir pipe 14a. Thus, whenever air under pressure is admitted to the door opening pipe 10a by manipulation of the snap action valve 12a, air pressure will also pass through seat 21a of the double check valve to unseat the ball valve 23a therefrom, thereby opening port 24a to the air pressure so that it passes through pipe 25a and quick release valve 26a into the brake chambers 38a.

When the door operating valve is in neutral position, it will be seen that it will exhaust air pressure from pipes 25a and 63 through the exhaust port of the valve. Whenever the brake control valve 16a is operated, reservoir pressure is admitted through the lower seat 20a of the double check valve to automatically close ball valve 23a upon its seat 21a to prevent air pressure from passing to the door opening pipe while it is being directed through pipe 25a to the brake chamber 38a. Thus, it will be obvious that any variation of pressure in the door opening line 10a will shift the double check valve to automatically apply the brakes.

In the other modifications shown in Figs. 1 to 3 inclusive, it will be apparent that the slightest degree of movement of the door motor from a door closed position toward a door open position will shift the interlock valve to automatically supply fluid under pressure to the brake chambers to apply the brakes, or in Fig. 3 to the power cylinder 60 to disengage the clutch or control device. Thus, it will be apparent that as long as the doors remain open taking on or discharging passengers, there is no possibility for the operator to move the bus under power.

While I have thus illustrated and described certain embodiments of the invention, I do not wish to be understood as intending to limit it thereto, as the invention may be embodied in other constructions, and those shown and described may be variously modified and altered without departing from the spirit of the invention.

I claim:

1. The combination with a vehicle brake device, fluid pressure means for operating the same, of a door motor having a trip and a fluid pressure valve having inlet, outlet and exhaust ports and a spring seated stopper normally cutting off flow of pressure from the inlet to the outlet port, said valve having a spring moved ported tube normally engaged with said trip and connecting the brake device with said exhaust port, and said tube being movable against the tension of its spring to unseat said stopper upon movement of the motor trip within a very narrow range of its total movement to connect said inlet and outlet ports for supplying fluid under pressure to said brake device.

2. The ecombination with a vehicle brake device, a fluid pressure means for operating the same, of a door motor having a trip, and a fluid pressure valve, a spring urged lever having one end normally urged in the direction of said trip, a spring seated stopper normally cutting off flow of pressure from the inlet to the outlet port, and a ported tube normally urged away from said stopper and against the other end of said lever to connect said outlet and exhaust ports, and said tube being moved by said trip moving said lever against the tension of its spring to unseat the stopper to connect said inlet and outlet ports for supplying fluid under pressure to said brake device.

3. A valve of the class described comprising a casing having an inlet chamber, an intermediate outlet chamber and an exhaust chamber, a valve seat separating the inlet and outlet chambers, said inlet valve being normally urged upon said seat, a spring pressed slidable hollow valve having an open end and a port between its ends, said port being adapted to communicate with said exhaust chamber when the open end of said hollow valve is unseated from the inlet valve and is in communication with said outlet chamber, said open end of the hollow valve being normally arranged in said chamber and against said inlet valve to hold the same unseated and to close the open end of said hollow valve, said hollow valve extending through said exhaust chamber and having a closed end projecting exteriorly of the valve casing, and a spring pressed lever fulcrumed and engaged with said closed projecting end of the hollow valve to oppose the movement thereof and to retain the same engaged with said inlet valve with said port out of said exhaust chamber, and said lever being adapted to release said hollow valve enabling it to move to a position in which its open end is opened in said outlet and its port is disposed in said exhaust chamber.

4. Valve operating mechanism comprising a valve casing having a pair of bodies urged in the same direction and adapted to alternately seat and unseat when moved uni-directionally by one of said bodies, a valve operating lever fulcrumed with one end engaging one of said valve bodies and being spring urged to normally hold one of said valve bodies unseated, and a trip adapted to move against said valve lever to overcome its spring pressure and to release said valve bodies to the action of their spring urge to seat one and unseat the other.

5. In a door actuating system, a fluid pressure reservoir, a fluid pressure brake, a door actuating cylinder having a pressure chamber at each end thereof and a piston therein with a rod extending through and beyond one end of said cylinder for connection with said door, an abutment on said piston rod, an operator's valve for directing fluid pressure to either end of said cylinder, and an automatic normally closed valve connected directly to said reservoir and to said brake and operated by engagement of said piston rod abutment with said automatic valve to open the same for the passage of fluid pressure directly from said reservoir through said automatic valve to said brake.

JOHN R. ALMOND